United States Patent [19]
Gebelius

[11] 3,797,529
[45] Mar. 19, 1974

[54] SUPPORTING AND INSULATING DEVICE FOR A PIPING SYSTEM

[76] Inventor: Sven Runo Vilhelm Gebelius, Fridhemsgatan 27, 112 40 Stockholm K., Sweden

[22] Filed: Dec. 17, 1971

[21] Appl. No.: 209,187

[52] U.S. Cl. .................... 138/111, 138/108, 174/97
[51] Int. Cl. ............................ F16l 9/22, F16l 3/22
[58] Field of Search ....... 138/108, 149, 111; 174/97

[56] References Cited
UNITED STATES PATENTS

| | | | |
|---|---|---|---|
| 3,503,425 | 3/1970 | Holm | 138/108 |
| 307,872 | 11/1884 | Ryckman | 138/108 |
| 317,326 | 5/1885 | Fague | 138/108 X |
| 714,716 | 12/1902 | Lappin | 138/108 X |
| 1,220,343 | 3/1917 | Kimball | 138/108 X |
| 2,857,931 | 10/1958 | Lawton | 138/149 X |

FOREIGN PATENTS OR APPLICATIONS

| | | | |
|---|---|---|---|
| 430,261 | 8/1911 | France | 138/108 |

Primary Examiner—Herbert F. Ross
Attorney, Agent, or Firm—Eric Y. Munson

[57] ABSTRACT

A supporting and insulating device for pipes comprising a pair of elongated, thermally insulating elements having joining faces presenting one or more lengthwise running grooves shaped to complement one another completely to embrace the pipe or pipes when the elements are placed together about the pipe or pipes, each of said groove or grooves being hook shaped in cross section and individually capable of supporting and locating a pipe inserted in the groove once the element has been fixed in position and prior to the other element being attached to it.

1 Claim, 9 Drawing Figures

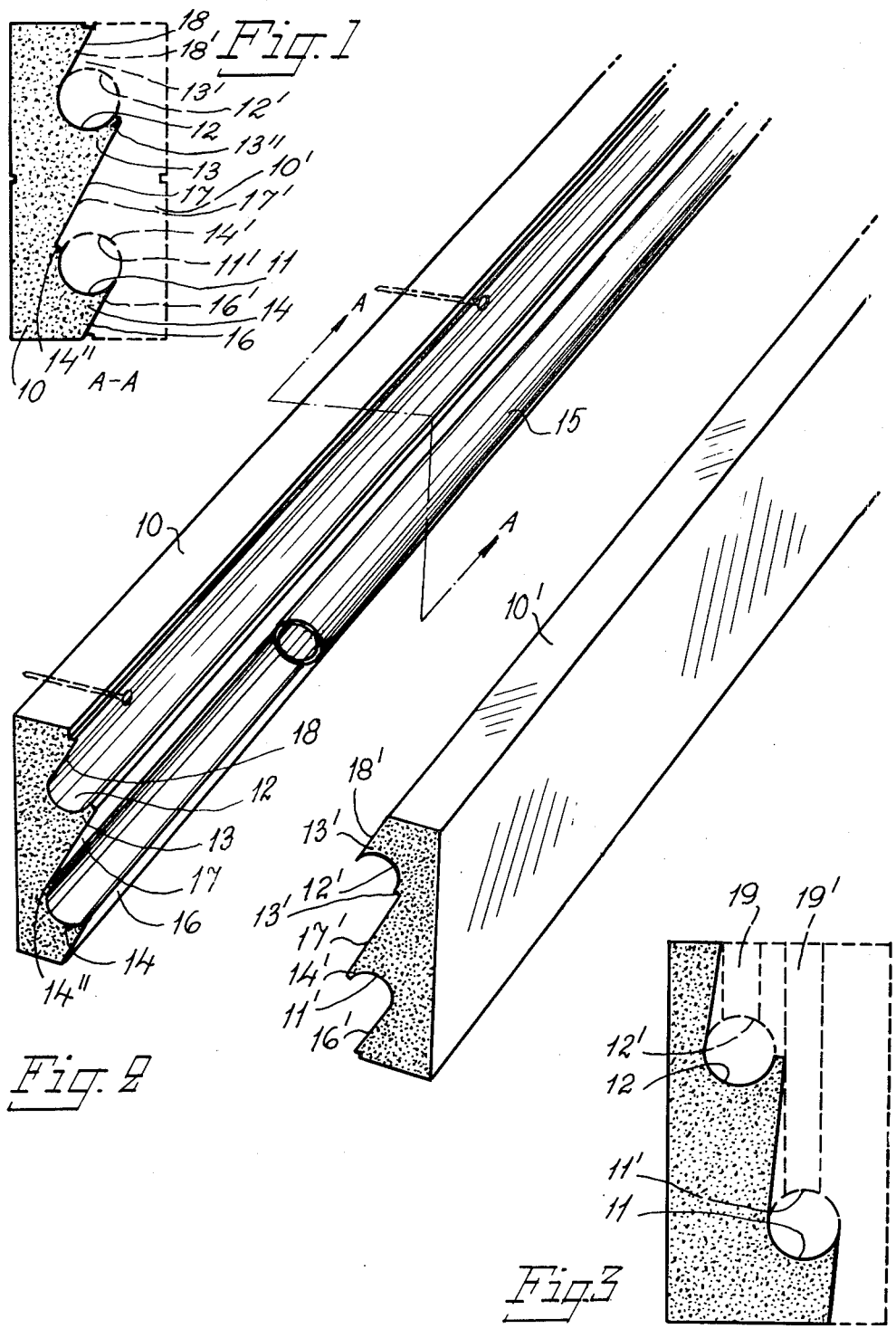

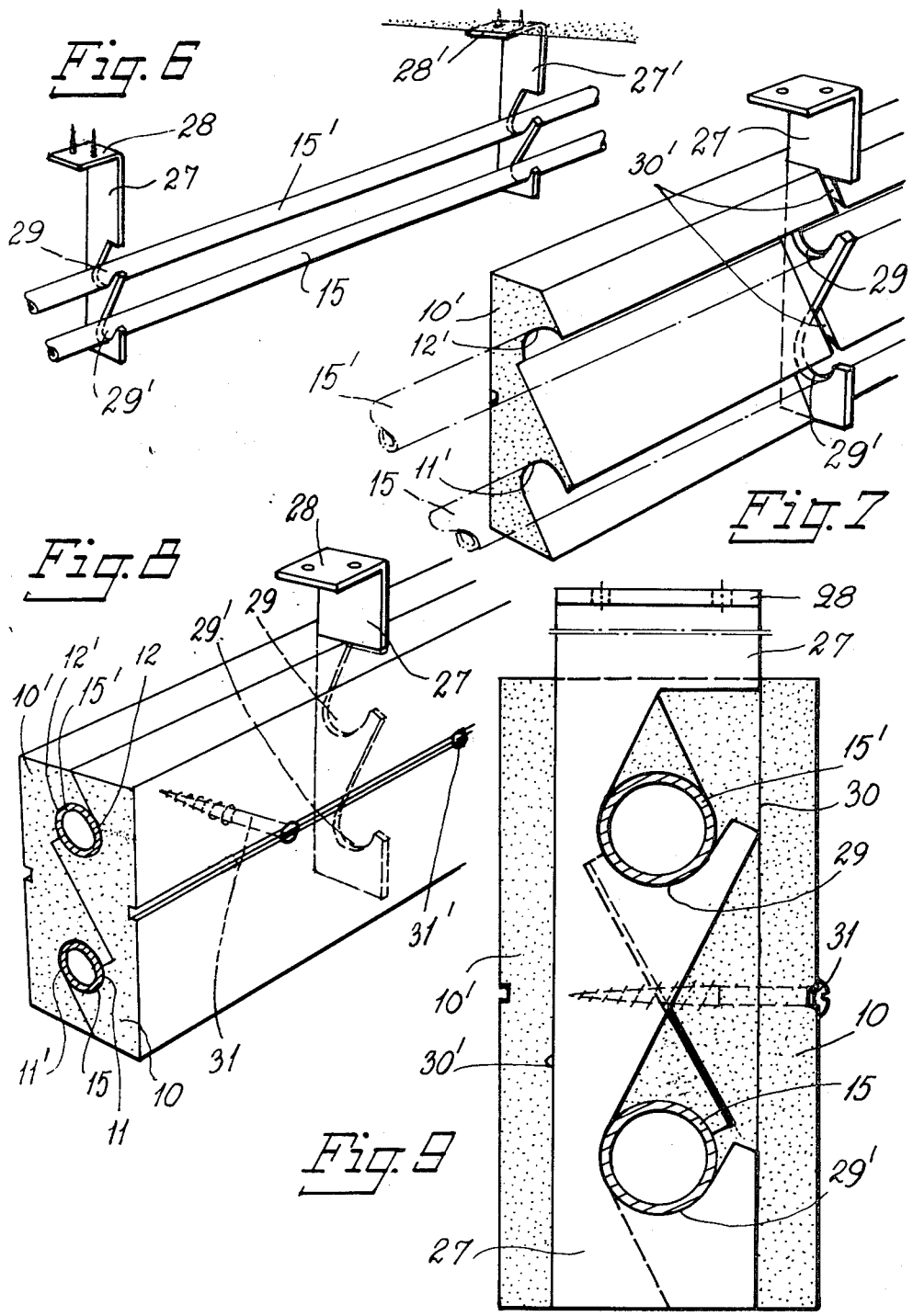

SUPPORTING AND INSULATING DEVICE FOR A PIPING SYSTEM

This invention comprises improvements relating to supporting and insulating pipes.

When installing a piping system in a building, brackets are commonly used, the brackets being arranged to grip the pipes and secure them to ceilings and walls of the building. Pipes that should be insulated are then usually wrapped. This method involves considerable manual work and the result is esthetically unpleasing. As a result the pipes are commonly covered by means of panels or run above a false ceiling for example. This method is not only expensive, but it is also extremely difficult to carry our repairs or to alter the piping system when desired. It is not possible from the esthetical point of view to arrange the piping system in positions where the need is, e.g., when the piping system is to be connected to convectors arranged at a considerable distance from the ceilings and walls of a building.

For a long time there has been a demand for a supporting and insulating device for pipes which is more esthetically acceptable.

The present invention provides a supporting and insulating device for pipes comprising a pair of elongated, thermally insulating elements having joining faces presenting one or more lengthwise running grooves shaped to complement one another completely to embrace the pipe or pipes when the elements are placed together about the pipe or pipes, each of said groove or grooves being hook shaped in cross section and individually capable of supporting and locating a pipe inserted in the groove once the element has been fixed in position and prior to the other element being attached to it.

According to a feature of the invention the joining faces of the elements present a number of inclined, parallel, plane surfaces which contact one another when the elements are placed together to embrace the pipe or pipes.

According to a further feature of the invention the joining faces of the elements present at least one lip and one ledge and each lip on one element is received on a ledge of the other element when the elements are placed together to embrace the pipe or pipes.

According to a still further feature of the invention the device may further comprises brackets for suspending said elements from a wall or ceiling structure, the brackets having a hook shaped recess or hookshaped recesses in one limb for supporting a pipe or pipes and said elements have transversely directed grooves in their joining faces to receive said limbs.

Specific embodiments of the present invention will now be described by way of example with reference to the accompanying drawings, in which:

FIG. 2 is an exploded perspective view of a supporting and insulating device according to the invention;

FIG. 1 is a cross-section on line A—A in FIG. 2, showing one part in broken lines;

FIG. 3 is a cross-section through a further supporting and insulating device according to the invention, showing one part in broken lines;

FIG. 8 is a perspective view of part of a still further supporting and insulating device according to the invention;

FIG. 6 is a perspective view of a different part of the device shown in FIG. 8;

FIG. 7 is a perspective view corresponding with FIG. 8 but showing a sub assembly thereof and FIG. 9 is an end view in FIG. 8 to a larger size.

Figures 4, 5:
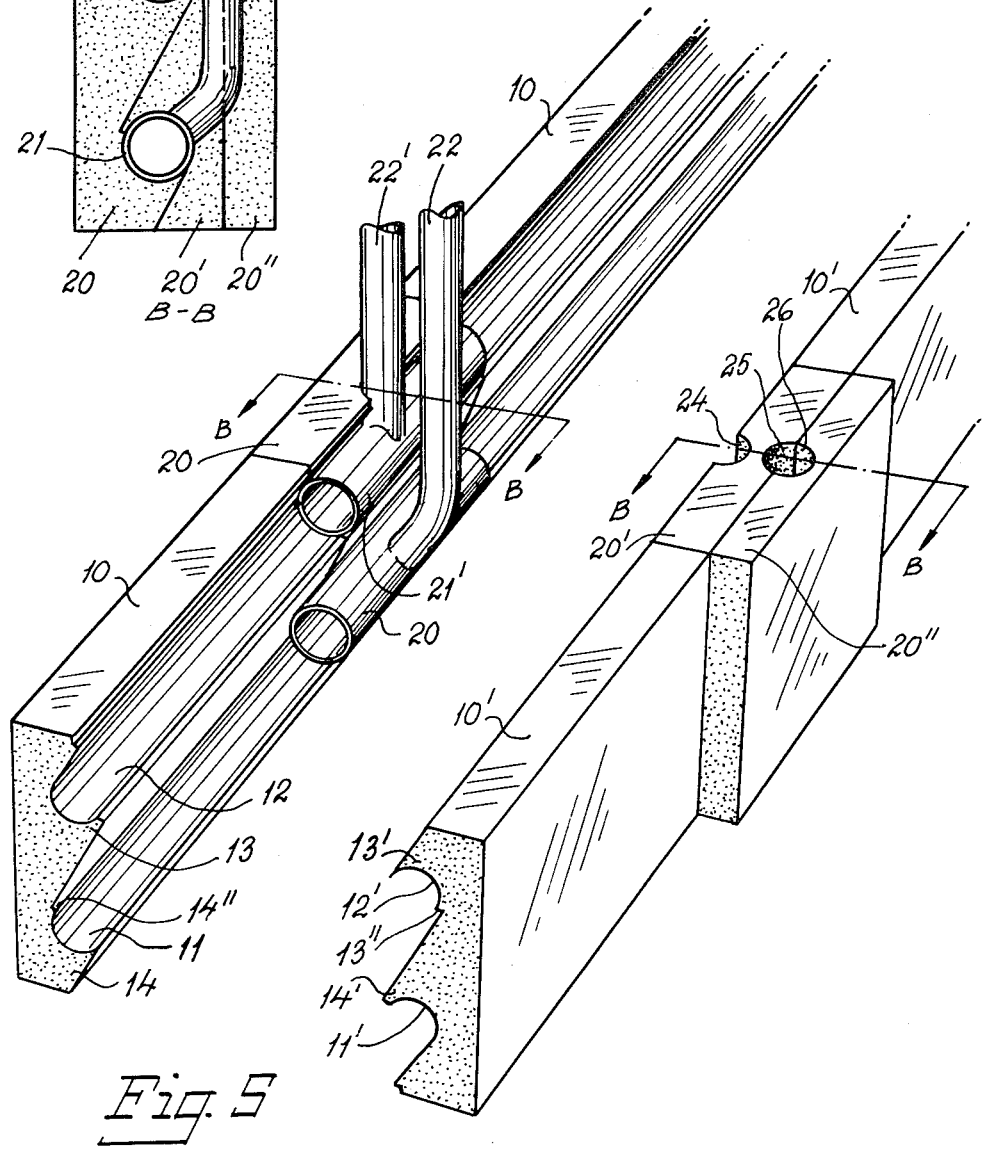
FIG. 5 is an exploded perspective view of a still further supporting and insulating device according to the invention.
FIG. 4 is a cross-section on line B—B in FIG. 5.

Referring to the accompanying drawings and first to FIGS. 1 and 2 one elongated element is indicated at 10 another at 10'. The elements 10, 10' are in this, and the further embodiments to be described, made of a rigid, porous material which is preferably polyurethane foam and which has a smooth non-perforate outer surface. The elements 10, 10' are rectangular in cross-section when assembled together to form the device. The elements 10, 10' have joining faces presenting lengthwise running grooves 11, 11' and 12, 12' which are semi-circular in cross-section, and centred on axes extending parallel with one another in a plane parallel with opposite faces of the assembled device. The grooves 11, 11', 12, 12', are in part defined by lips 13, 13' and 14, 14' which will retain pipes 15 in the grooves when the element is fixed to a wall or ceiling of a building with the plane of the axes of the grooves vertical and the grooves opening upwardly so as to support the pipes. The joining faces of the elements 10 and 10' are made up of inclined, parallel, plane surfaces 16, 17, 18 and 16', 17', 18', which make contact with one another when the elements 10, 10' are joined. At least one lip 13, 14' on each joining face is received on a ledge 13", 14" on the other joining face, thereby automatically guiding and locating the elements in proper joining relation with respect to one another. The inclined, plane surfaces 16, 17, 18 and 16', 17', 18' facilitate the insertion of pipes 15 into the grooves 11, 11' and 12, 12'. In FIGS. 1 and 2 the element 10 is assumed fixed to a vertical wall surface, and the pipes 15 rest in the grooves 11, 12' without fixture, whereafter the element 10' is located and fixed to the element 10 to form the complete device which encloses and insulates the pipes 15. When carrying out repairs or alterations in the piping system, it is extremely easy to remove the element 10' to gain access to the pipes and to replace same when the work is complete.

Esthetically the device is acceptable as well as being cheap and easy to install. The design of the elements 10, 10' makes it possible to arrange the device practically anywhere within a building, e.g., on the walls or ceilings. It is also possible to arrange the device at a desired distance from a ceiling or wall by using support members to support the device from the wall or ceiling.

The device shown in FIG. 3 is modified in that the grooves 11, 12 and 11', 12' have their parallel axes extending in spaced apart planes parallel with opposite faces of the assembled device, whereby holes 19, 19' for branch pipes 22, 22' can be accomodated on one side of the device.

FIGS. 4 and 5 show a joining piece for use with devices as described with reference to FIGS. 1 and 2 comprising three parts 20, 20', 20", and in which T-pieces 21, 21' having perpendicularly extending branch pipes 22, 22' can be accomodated. The pipes 22, 22' could extend directly from pipes 15 arranged in the grooves 11, 11', 12, 12' of the elements 10, 10' instead.

The joining piece 20, 20', 20" consists of an inside part 20, corresponding in cross-section with the element 10, but having a recess 23 for the branch pipe 22'. The second part of the joining piece 20' has a cross-section corresponding with the element 10', and has two recesses 24, 25 for the pipes 22, 22' respectively. The third part of the joining piece 20" consists of a plane member 20" having a recess 26 for the pipe 22. The inside part 20 is first fixed along with and between adjacent elements 10, for example to a wall, whereafter the second part 20' is fixed to the inside part 20 along with and between adjacent elements 10' which are fixed to the elements 10. The third part of the joining piece 20" is thereafter fixed to the second part 20'. The T-pieces 21, 21', are preferably arranged in the grooves 11, 11', 12, 12', thus holding the joining piece parts 20, 20' in position without any fastening means, whereafter the third part 20" is fixed to the second part 20' by means of nails or screws. The devices 10, 10' and the joining piece 20, 20', 20" can be freely suspended on the pipes.

Referring now to FIGS. 6, 7, 8 and 9, support members 27 and 27' in the form of angle brackets have limbs 28, 28' with holes for screws or the like for fixing them to a ceiling. The depending limbs of the brackets have hookshaped, downwardly directed recesses 29, 29' extending from one vertical edge in which pipes 15, 15' can be supported. The joining faces of the elements 10, 10' described with reference to FIGS. 1 and 2 are grooved as at 30, 31' to receive the depending limbs of the brackets which are conveniently a push fit in the grooves 30, 30'. The recesses 29, 29' correspond to the profile of the joining faces of the elements 10, 10' to the extent sufficient to allow the elements 10, 10' to be fitted to pipes 15, 15' supported on the recesses 29, 29'.

In use, brackets 27, 27' are fixed to the ceiling at the correct spacing. The pipes 15, 15' are thereafter suspended on the brackets as shown in FIG. 6, whereafter the elements 10' are engaged with the brackets and at the same time hooked onto the pipes so that the pipes support the elements 10' as shown in FIG. 7. The elements 10 are thereafter positioned and fixed to the elements 10' by means of screws 31, 31' as shown in FIGS. 8 and 9. The insulating device is thereby firmly fixed to the brackets 27, 27' but is easily removed when so is desired.

The brackets 27, 27' may be reshaped for attachment to a vertical wall instead of a ceiling whilst retaining the pipe supporting recesses 29, 29' in a position corresponding with that already described.

It should be noted that the elements 10, 10' can have a greater number of grooves to accommodate pipes.

What I claim is:

1. A supporting and insulating device for pipes comprising an elongated, thermally insulating element having a body structure with a generally flat back surface and with grooves in its front surface, said elongated structure being adapted to be disposed and supported, in part at least, as a beam in service, with its flat back surface disposed generally vertical, and the grooves being shaped as a tilted -J- or hook, with the bottom concave, to permit a pipe to be laid into each groove obliquely above in front, with the groove serving then to hold the received pipe in position, and comprising further a similar second elongated element for mating with said first elongated element, in front, to enable the J-shaped surfaces of both elements to embrace the pipe or pipes when the two elongated elements are placed together to mate about the pipe or pipes, each of said groove or grooves being hook shaped in cross section and individually capable of supporting and locating a pipe inserted in the groove once the elongated element has been fixed in position and prior to the other element being mated and attached to it, whereby the pipe or pipes so covered are provided with effective thermal insulation that is economical in application, said device further comprising a pair of joining pieces to fit longitudinally between two aligned and spaced insulating elements of a mated set of longitudinal elements, and said pair of joining pieces having corresponding and matching longitudinal J-shaped grooves, to correspond endwise to the grooves in the adjacent insulating elements, said joining pieces comprising first and second joining parts corresponding respectively in cross sectional size and shape with said mated set of elements, said joining parts having longitudinal grooves for a pair of pipes and transverse recesses in their joining faces, each transverse recess communicating with one of the grooves, the recesses in said joining parts being shaped to complement one another completely to embrace a pipe branching from a pipe located in said one of said grooves, the joining pieces further comprising a third joining part having a recess shaped to complement a transverse recess in said second part and communicating with the other groove in said second part to completely embrace a branch pipe branching from a main pipe located in said other groove.

* * * * *

UNITED STATES PATENT OFFICE
CERTIFICATE OF CORRECTION

Patent No. 3,797529      Dated March 19, 1974

Inventor(s) Sven Runo Vilhelm Gebelius

It is certified that error appears in the above-identified patent and that said Letters Patent are hereby corrected as shown below:

[30] Foreign Application Priority Data

December 30, 1970      Sweden........17705/1970

October 20, 1971      Sweden........13250/1971

Signed and sealed this 9th day of July 1974.

(SEAL)
Attest:

McCOY M. GIBSON, JR.      C. MARSHALL DANN
Attesting Officer      Commissioner of Patents